United States Patent [19]
Haasch et al.

[11] Patent Number: 5,499,675
[45] Date of Patent: Mar. 19, 1996

[54] OIL COOLER WITH A SELF-RETAINING, SELF-ORIENTING PRESSURE RELIEF VALVE

[75] Inventors: James T. Haasch, Bay View; James J. Cavalluzzi, Big Bend, both of Wis.

[73] Assignee: Modine Manufacturing Company, Racine, Wis.

[21] Appl. No.: 402,127

[22] Filed: Mar. 10, 1995

[51] Int. Cl.$^6$ .................................................. F28F 3/12
[52] U.S. Cl. .................... 165/38; 165/157; 165/916
[58] Field of Search ............................ 165/38, 41, 103, 165/916, 157

[56] References Cited

U.S. PATENT DOCUMENTS

| | | |
|---|---|---|
| 2,360,123 | 10/1944 | Gerstung et al. |
| 3,743,011 | 7/1973 | Frost . |
| 4,360,055 | 11/1982 | Frost . |
| 4,561,494 | 12/1985 | Frost . |
| 4,580,625 | 4/1986 | Yamanaka et al. |
| 4,638,856 | 1/1987 | Yamanaka et al. |
| 4,669,532 | 6/1987 | Tejima et al. |
| 4,831,980 | 5/1989 | Nasu et al. |
| 4,967,835 | 11/1990 | Lefeber . |
| 5,236,043 | 8/1993 | Armbruster et al. |

*Primary Examiner*—Allen J. Flanigan
*Attorney, Agent, or Firm*—Wood, Phillips, VanSanten, Clark & Mortimer

[57] ABSTRACT

A simple, reliable bypass valve construction (50) is provided for use in conjunction with a donut oil cooler (16) having a flat, solid filter plate (36), whereby the bypass valve (52) will be self-located and self-retained to the oil cooler (16) during shipping. The bypass valve construction (50) is easily accessible and readily replaceable so as to lend itself to serviceability. The invention is incorporated in an oil cooler (16) having a housing (28) with a surface (26) adapted to be sealed against an oil filter (14). The oil cooler (16) includes a plurality of interconnected heat exchange units (21) located inside the housing (28), with an oil inlet to one of the units (21) and an oil outlet from another of the units (21). There is a centrally located opening (39) in the surface (26) of the oil cooler (16) to allow a connector (18) to pass through the oil cooler (16). A bypass valve (52) is provided and includes an inner ring (54) carrying a sheet-like resilient flapper (56) having a valve element (62) thereon sized to close a bypass outlet (64) in the housing surface (26). Tabs (80), (82), and (74) and slots (70), (72) and (76) are provided for loosely mounting the inner ring (54) to the housing surface (26) to retain the bypass valve (52) during shipment and prior to installation of the oil cooler (16).

15 Claims, 2 Drawing Sheets

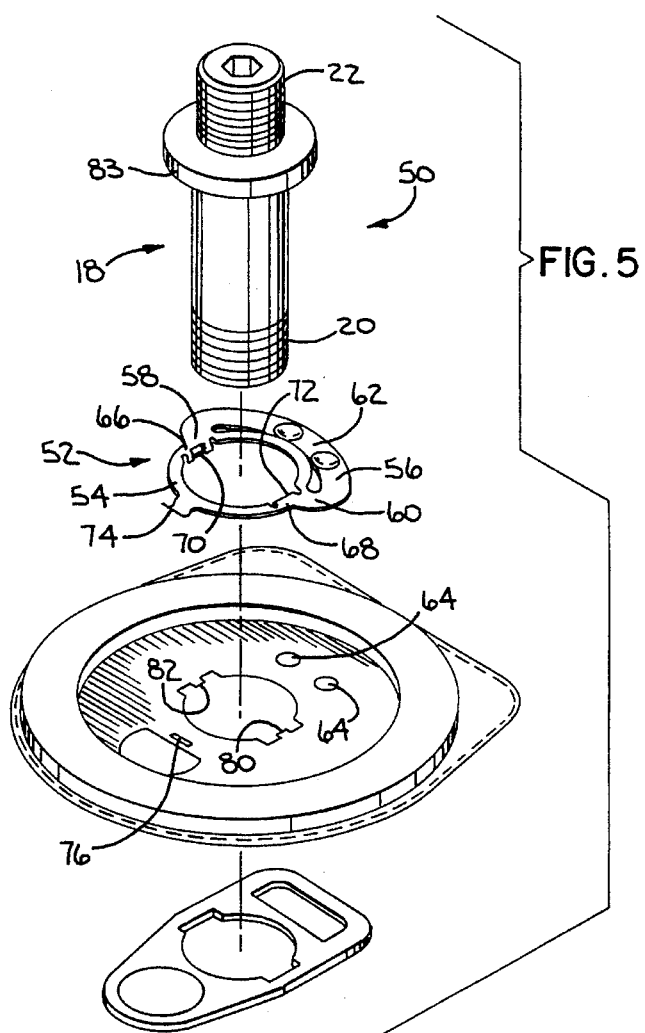
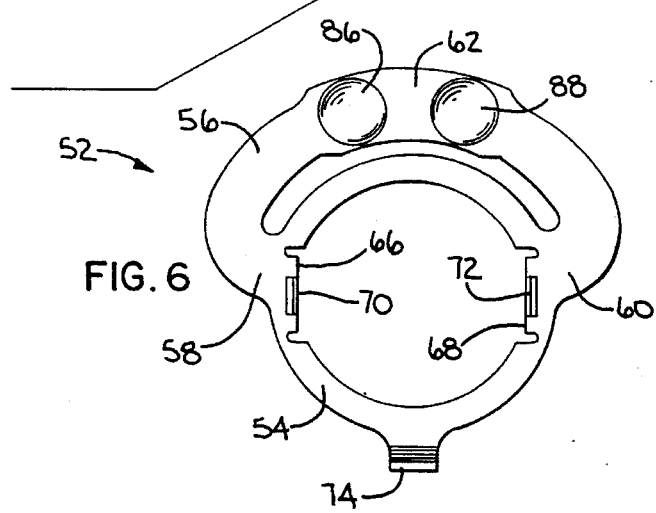
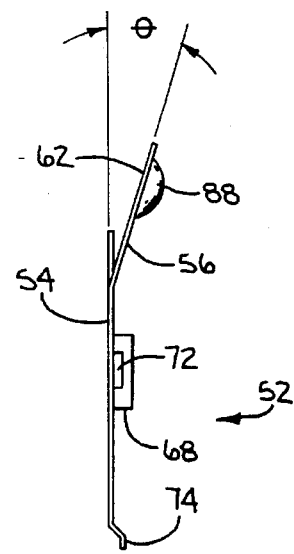
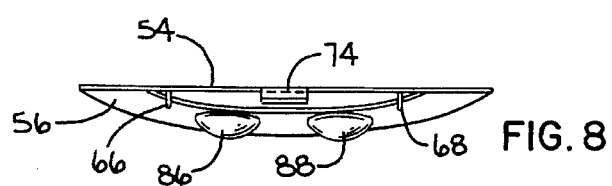
FIG. 5
FIG. 6
FIG. 7
FIG. 8

OIL COOLER WITH A SELF-RETAINING, SELF-ORIENTING PRESSURE RELIEF VALVE

FIELD OF THE INVENTION

This invention generally relates to the art of heat exchangers and, more particularly, to heat exchangers used as oil coolers in vehicular applications.

BACKGROUND OF THE INVENTION

The use of heat exchangers to cool lubricating oil employed in an internal combustion engine has long been known. One form of such heat exchangers currently in use is a so-called "donut" oil cooler. These oil coolers have an axial length of only a couple of inches or less and are constructed so that they may be interposed between the engine block and the oil filter, being attached direct to the block in a location formerly occupied by the oil filter.

Typically, oil coolers of this type include a multi-piece housing which is connected to the vehicular cooling system to receive coolant, and which contains a stack of relatively thin, disc-like chambers through which the oil to be cooled is circulated. It is common for the upper end of the heat exchanger to be defined by a stamped, sheet metal filter plate that is shaped to provide an annular peripheral chamber or dome which serves as a stabilizing mount for the oil filter when the filter is mounted to the heat exchanger. Normally, there is a central opening through the oil cooler through which a connector extends to attach the oil cooler to the engine block and the oil filter to the oil cooler.

It is also common, in such oil coolers, to employ bypass valves to allow the oil to bypass the disc-like chambers when the oil is at a high viscosity, as when cold, and obviously not in need of further cooling in the heat exchanger. This prevents both a large pressure drop in the oil as it passes through the heat exchanger to the filter and the over pressurization of the oil cooler housing.

Typically, this bypass function is provided by a spring-biased poppet valve or a sheet metal flapper valve placed in the oil cooler between the central opening and the dome of the filter plate. Conventional flapper valves have a biasing spring that is located and contained by the interior of the dome of the filter plate, with a flapper extending inwardly towards the central opening. Conventional spring-biased poppet valves are inserted in the available area between the central opening and the dome. Both types of valves work well for their intended purpose.

However, due to current efforts in the automobile industry to increase fuel efficiency, there have been changes in the construction of the oil coolers which are incompatible with these conventional types of bypass valves.

One of the changes in construction involves an adaptation to allow the oil cooler to mate with larger diameter, higher flow capacity oil filters. Increasing the diameter of the oil filter, rather than the length, allows for higher capacity filters to be installed in engine compartments without requiring room for additional length. Due to their stamped sheet metal configuration, conventional domed filter plates are limited as to the diameter of oil filter with which they can mate. One solution to this problem has been to replace the conventional domed plate with a flat, solid filter plate having a sealing surface that extends to the outermost diameter of the oil cooler. This allows the oil cooler to be mated with several different diameters of oil filters, including filters with diameters that approximate the diameter of the oil cooler.

However, the use of the solid filter plate prevents the oil cooler from using a conventional flapper pressure relief valve. As noted earlier, conventional flapper valves require a dome/annular chamber for location and constraint. Further, spring-biased poppet valves require additional oil cooler length, which is undesirable in oil coolers designed for use with large diameter filters. Additionally, some users of such oil coolers are hesitant to employ spring-biased poppet valves, due to reliability concerns related to multipart components.

Thus, it can be seen that there is a need for a new and reliable bypass pressure relief valve which can be incorporated within an oil cooler having a solid, flat filter plate.

SUMMARY OF THE INVENTION

It is the principal object of the invention to provide a new and improved bypass valve configuration. More specifically, it is an object to provide a simple, reliable bypass valve configuration that can be used in conjunction with a donut oil cooler having a flat, solid filter plate, whereby the bypass valve will be self-located and self-retained on the oil cooler during shipping.

In a preferred embodiment, the invention is incorporated in an oil cooler having a housing with a coolant inlet and outlet, and a surface adapted to be sealed against an oil filter. The oil cooler includes a plurality of interconnected heat exchange units located inside the housing, with an oil inlet to one of the units and an oil outlet from another of the units. There is a centrally located opening in the surface of the oil cooler to allow a connector to pass through the oil cooler. An oil bypass is provided through at least some of the interconnected heat exchange units and communicates with a bypass outlet in the housing surface. A bypass valve is provided and includes an inner ring carrying a sheet-like resilient flapper having a valve element thereon sized to close the bypass outlet. Tab means are provided for loosely mounting the inner ring to the surface of the housing to retain the inner ring and the flapper during shipment and prior to installation of the oil cooler.

According to one facet of the invention, the connector firmly secures the inner ring and the flapper to the oil cooler by clamping the inner ring to the surface of the housing when the oil cooler is in the installed position.

According to another facet of the invention, the valve element is sized to at least partially enter the bypass outlet to close the bypass outlet.

According to still another facet of the invention, the tab means includes tabs on either the inner ring or the housing surface and aligned, tab-receiving slots on the other of the inner ring or the housing surface. The tab means serves to at least nominally locate the valve element with respect to the bypass outlet and to retain the inner ring and flapper during shipment and prior to installation of the oil cooler.

In one embodiment, the tab means includes diametrically opposed slots adjacent the inner diameter of the inner ring, and a foot extending from the outer diameter of the inner ring. The centrally located opening in the oil cooler includes spaced tabs impaled in the slots to retain the inner ring and the flapper during shipment and prior to installation of the oil cooler and to nominally locate the valve element with respect to the bypass outlet. The housing surface includes a slot which receives the foot to nominally locate the valve element with respect to the bypass outlet.

According to yet another facet of the invention, at least one foot and/or slot is carried on the inner ring and at least one of the centrally located opening and the surface includes means cooperating with the foot and/or slot to at least nominally locate said valve element with respect to the bypass outlet and to retain the inner ring and the flapper during shipment and prior to installation of the oil cooler.

According to one facet of the invention, the flapper is generally C-shaped and is located outside of the inner ring and joined to the inner ring at two nominally diametrically opposed locations. Further, the valve element is carried by the flapper intermediate the opposed locations.

According to yet another facet of the invention, the inner ring includes a foot extending from the outer diameter of the inner ring and diametrically opposed slots. The centrally located opening includes spaced tabs received in the slots and the surface includes a slot spaced from the tabs and receiving said foot to nominally locate the valve element with respect to the bypass outlet and to retain the inner ring and the flapper during shipment and prior to installation of the oil cooler.

According to another facet of the of the invention, the bypass valve includes a ring of sheet-like material and a resilient flapper extending from the ring. There are a pair of spaced slots in the ring receiving respective tabs formed in the housing surface, and a generally S-shaped foot located between the spaced slots and extending into a slot in the surface. The ring includes spaced, downturned tabs with each of the tabs having one of the slots formed therein.

According to another facet of the invention, the flapper is generally C-shaped and is located outside of the ring of sheet-like material. The ends of the flapper are integrally connected to a radially outer edge of the ring adjacent the downturned tabs which are located at a radially inner edge of the ring.

Other objects and advantages will become apparent from the following specification taken in connection with the accompanying drawings.

BRIEF DESCRIPTION OF THE DRAWINGS

FIG. 5 is an exploded perspective view of selected elements of a heat exchanger according to the present invention;

FIG. 6 is a top view of the bypass valve removed from the heat exchanger;

FIG. 7 is a side elevational view of the bypass valve; and

FIG. 8 is a rear elevational view of the bypass valve.

DESCRIPTION OF THE PREFERRED EMBODIMENTS

Figure 1:
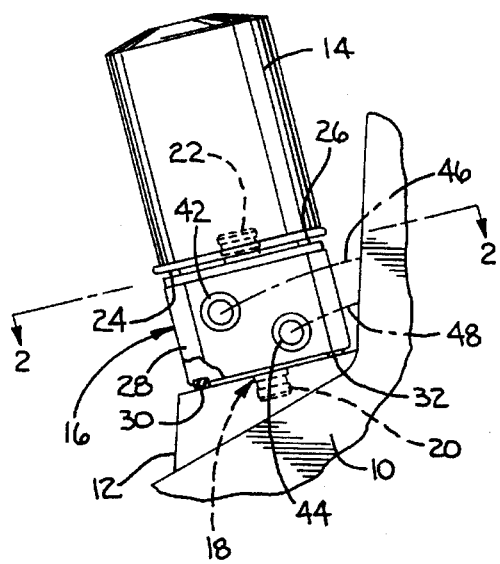
FIG. 1 is a side elevational view partially in section of an engine block having mounted thereon a heat exchanger oil cooler employing a bypass valve configuration embodying the invention, with an oil filter of the customary type in position superimposed on the oil cooler.

An exemplary embodiment of a heat exchanger made according to the invention is described herein and is illustrated in the drawings in connection with an oil cooling function for the lubricating oil of an internal combustion engine. However, it should be understood that the invention may find utility in other applications, and that no limitation to use as an oil cooler is intended except insofar as expressly stated in the appended claims.

With reference to FIG. 1, the block of an internal combustion engine is fragmentarily shown at 10 and includes a seat 12 which is normally adapted to receive an oil filter 14. In the case of the invention, however, a donut oil cooler, generally designated 16, is interposed between the oil filter 14 and the seat 12. The oil cooler 16 is conventional apart from its bypass valve and filter mating surface and reference may be made to U.S. Pat. No. 4,360,055 for details of its construction. More particularly, the heat exchanger 16 is held in sandwiched relation between the filter 14 and the seat 12 by a connector, generally designated 18 and best shown in FIG. 5. The connector 18 has one threaded end 20 that is threaded in the oil return port in the seat 12 and an opposite threaded end 22 which is threaded into the central opening of the filter 14.

Figure 3:
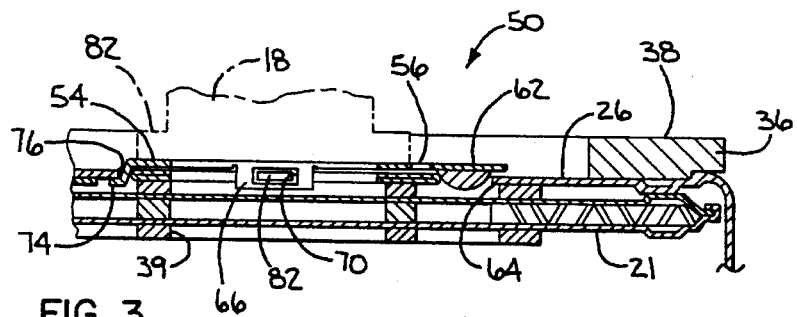
FIG. 3 is an enlarged, fragmented, sectional view of the heat exchanger shown in FIG. 2 taken substantially along the line 3—3 of FIG. 2.

The seal 24 conventionally carried by the oil filter 14 sealingly engages a planar surface 38 of a ring-like filter plate 36 provided on one face 26 of a housing 28 for the heat exchanger 16, as best seen in FIG. 3. An O-ring seal 30 is interposed between the opposite face 32 of the housing 28 and the seat 12.

Figure 2:
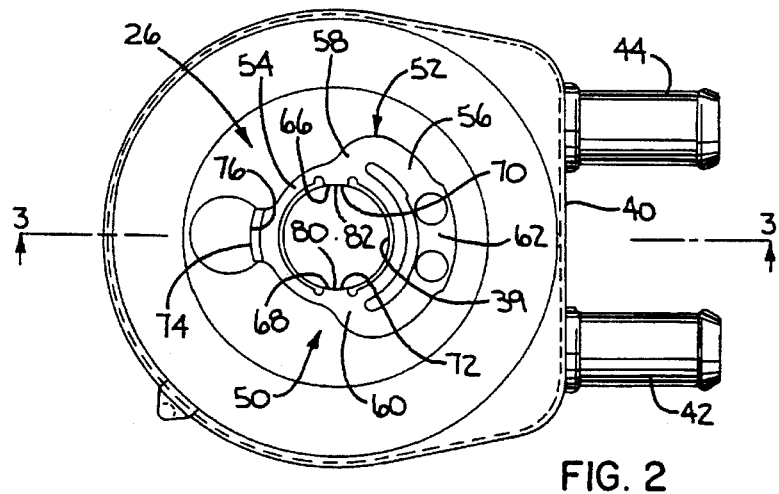
FIG. 2 is a top view of the heat exchanger shown in FIG. 1 taken substantially along the line 2—2 of FIG. 1.

As seen in FIG. 2, the oil cooler has a central opening 39. The connector 18 passes through the central opening 39 so that it may engage both the filter 14 and the block 10.

As seen in FIGS. 1 and 2, the housing 28 includes, on one side 40, spaced inlet and outlet nipples 42 and 44, respectively, which may be connected by hoses shown schematically at 46 and 48 in FIG. 1 into the coolant system for the internal combustion engine.

Turning now to FIGS. 2, 5, and 6, the improved bypass valve construction 50 of the present invention is seen in greater detail. The construction 50 includes a bypass valve 52 mounted on the face 26. The bypass valve 52 includes an inner ring 54 and a generally C-shaped sheet-like resilient flapper 56 joining the inner ring at two nominally diametrically opposed locations 58 and 60 at the outer diameter of the inner ring 54. Typically, both the inner ring 54 and the flapper 56 will be made out of one piece of a suitable spring steel sheet material. A valve element 62 is located on the flapper 56 intermediate the opposed locations 58 and 60. The valve element 62 is sized to close a bypass outlet 64 in the housing surface 26.

Two diametrically opposed flaps 66 and 68 having tab-receiving slots 70 and 72 formed therein extend downwardly from the inside diameter of the inner ring 54. An S-shaped foot 74 extends from the outside diameter of the inner ring 54 intermediate the opposed locations 58 and 60 and opposite the valve element 62. The housing surface 26 includes a slot 76 receiving the S-shaped foot 74 and tabs 80 and 82 which are impaled in the slots 70 and 72 for loosely mounting the bypass valve 52 to the surface 26 to retain the bypass valve during shipment and prior to installation of the oil cooler 16 on the engine 10.

It will be appreciated, that any suitable cooperating means on the inner ring 54 and on the surface 26 may be used for loosely mounting the bypass valve 52 to the surface 26 to retain the bypass valve during shipment and prior to the installation of the oil cooler. For example, any form of protrusion may be used on either the inner ring 54 or the surface 26 to engage any form of mating aperture in either the inner ring 54 or the surface 26. Further, any combination of protrusions and apertures may be used, with some protrusions and/or apertures on the inner ring 54 and some protrusions and/or apertures on the surface 26.

After installation of the oil cooler, the connector 18 firmly secures the bypass valve 52 to the surface 26 with an annular extension 83 which compresses the inner ring 54 against the surface 26. It is this same compression force that secures the oil cooler 16 to the engine block 10.

Figure 4:
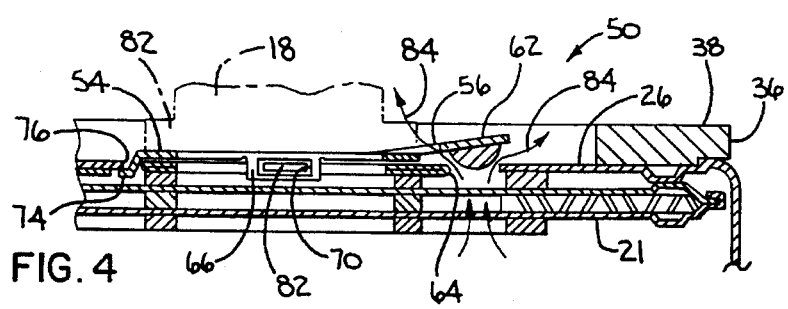
FIG. 4 is a view of a heat exchanger as shown in FIG. 3 with the bypass valve in the open position.

In the preferred embodiment, the valve element 62 is sized to at least partially enter the bypass outlet 64, as best seen in FIG. 3. The bypass valve configuration 50 is normally closed, with the valve element 62 seated in the bypass outlet 64. However, when the viscosity of the liquid is high, such as in the case of cold oil, the pressure of the cold oil is sufficient to displace the valve element 62 upwardly to the open position, as shown in FIG. 4, thereby permitting the oil to pass directly from the oil cooler 16, as indicated by arrows 84, thus bypassing the oil chambers 21. The valve element 62 is forced towards the closed position by the resilient flapper 56 which acts as a leaf spring applying a downward force to the valve element 62.

Turning now to FIGS. 6, 7, and 8, the bypass valve 52 is shown in greater detail and removed from the oil cooler 16. The valve element 62 includes two spherical seals 86 and 88 that are formed integrally with the valve element 62 and which are shaped and sized to at least partially enter the bypass outlet 64 thereby sealing off oil flow.

It will be appreciated, that the bypass outlet 64 is not limited to the configuration shown and that it may be of any suitable shape and size and may consist of one opening or multiple openings. It will also be appreciated, that the valve element 62 may include any suitable seal that is shaped and sized to mate with any particular bypass outlet configuration 64.

As best seen in FIGS. 7 and 8, the flapper 56 extends at an angle Θ from the plane defined by the inner ring 54 so that when the bypass valve 52 is installed on the surface 26, the flapper 56 applies a preload force to the valve element 62, forcing the valve element 62 to at least partially enter and seal the bypass outlet 64 when the oil is at a low viscosity. The angle Θ is selected for each particular application depending on the desired maximum pressure drop through the oil cooler 16.

It will be appreciated, that while the generally C-shaped design of the flapper 56 is particularly well adapted to applying a suitable valve-closing force, the bypass valve 52 is not limited to the configuration shown. It is anticipated that any number of configurations may be employed to apply a suitable valve-closing force. Such configurations may include flappers of a generally rectangular shape and/or flappers which are connected to the inner ring at only a single location.

It will also be appreciated that, although the flaps 66 and 68 and the foot 74 are shown extending downward from the inner ring 54, the downward extension is not a strict requirement of the present invention. It is anticipated that suitable bypass valve configurations could also include an essentially flat inner ring having no downward extensions, but still having tabs and/or slots that would mate with tabs and or openings in the surface 26.

Thus, a simple, reliable bypass valve construction 50 is provided for use in conjunction with the donut oil cooler 16 having a flat, solid filter plate 36, whereby the bypass valve 52 will be self-located and self-retained to the oil cooler 16 during shipping. The bypass valve construction 50 is easily accessible and readily replaceable so as to lend itself to serviceability.

We claim:

1. In an oil cooler including a housing, a coolant inlet to the housing, and coolant outlet from the housing, a housing surface adapted to be sealed against an oil filter, a plurality of interconnected heat exchange units within said housing, an oil inlet to one of said units, an oil outlet from another of said units, a centrally located opening in said surface for allowing a connector to pass through the oil cooler, an oil bypass through at least some of said units, a bypass outlet in said housing surface and a bypass valve normally closing said bypass outlet, the improvement wherein said bypass valve comprises:

an inner ring;

a sheet-like resilient flapper carried by said inner ring;

a valve element carried by said flapper, sized to close said bypass outlet; and tab means for loosely mounting said inner ring to said surface to retain said inner ring and flapper during shipment and prior to installation of the oil cooler.

2. The improvement of claim 1 wherein said connector firmly secures said inner ring and flapper to the oil cooler by clamping said inner ring to said surface when the oil cooler is in the installed position.

3. The improvement of claim 1 wherein said valve element is sized to at least partially enter said bypass outlet to close the same.

4. The improvement of claim 1 wherein said tab means comprise tabs on one of said inner ring and said surface and aligned, tab receiving slots in the other of said inner ring and said surface to at least nominally locate said valve element with respect to said bypass outlet and to retain said inner ring and flapper during shipment and prior to installation of the oil cooler.

5. The improvement of claim 1 wherein said tab means include diametrically opposed slots adjacent the inner diameter of said inner ring, and a foot extending from the outer diameter of said inner ring; and wherein:

said centrally located opening includes spaced tabs impaled in said slots to retain said inner ring and flapper during shipment and prior to installation of said oil cooler and to nominally locate said valve element with respect to said bypass outlet; and said surface includes a slot receiving said foot to nominally locate said valve element with respect to said bypass outlet.

6. In an oil cooler including a housing, a coolant inlet to the housing, and coolant outlet from the housing, a housing surface adapted to be sealed against an oil filter, a plurality of interconnected heat exchange units within said housing, an oil inlet to one of said units, an oil outlet from another of said units, a centrally located opening in said surface for allowing a connector to pass through the oil cooler, an oil bypass through at least some of said units, a bypass outlet in said housing surface and a bypass valve normally closing said bypass outlet, the improvement wherein said bypass valve comprises:

an inner ring;

a sheet-like resilient flapper carried by said inner ring;

a valve element carried by said flapper and sized to at least partially enter said bypass outlet to close the same;

at least one of a foot and a slot carried by said inner ring; and at least one of said centrally located opening and said surface including means cooperating with said at least one of a foot and a slot to at least nominally locate said valve element with respect to said bypass outlet and to retain said inner ring and flapper during shipment and prior to installation of the oil cooler.

7. The improvement of claim 6 wherein said flapper is generally C-shaped and is located outside of the inner ring, joining the inner ring at two nominally diametrically opposed locations.

8. The improvement of claim 6 wherein said valve element is carried by said flapper intermediate the opposed locations.

9. The improvement of claim 6 wherein said connector secures said inner ring and flapper to the oil cooler by clamping said inner ring to said surface when the oil cooler is in the installed position.

10. The improvement of claim 6 further comprising:

diametrically opposed slots in said inner ring;

a foot extending from the outer diameter of said inner ring; and wherein said centrally located opening includes spaced tabs received in said slots to retain said inner ring and flapper during shipment and prior to installation of said oil cooler and to nominally locate said valve element with respect to said bypass outlet; and said surface includes a slot spaced from said tabs and receiving said foot to nominally locate said valve element with respect to said bypass outlet.

11. In an oil cooler including a housing, a coolant inlet to the housing, and coolant outlet from the housing, a housing surface adapted to be sealed against an oil filter, a plurality of interconnected heat exchange units within said housing, an oil inlet to one of said units, an oil outlet from another of said units, a centrally located opening in said surface for allowing a connector to pass through the oil cooler, an oil bypass through at least some of said units, a bypass outlet in said housing surface and a bypass valve normally closing said bypass outlet, the improvement wherein said bypass valve comprises:

a ring of sheet-like material;

a resilient flapper valve extending from said ring;

a pair of spaced slots in said ring and receiving respective tabs formed in said housing surface; and a foot located between said spaced slots and extending into a slot in said surface.

12. The improvement of claim 11 wherein said ring includes spaced, downturned tabs, each of said tabs having one of said slots formed therein.

13. The improvement of claim 11 wherein said foot is generally S-shaped.

14. The improvement of claim 13 wherein said ring includes spaced, downturned tabs, each of said tabs having one of said slots formed therein; and wherein said foot is generally S-shaped; and wherein said flapper valve is generally C-shaped and has its ends integrally connected to said ring adjacent said tabs.

15. The improvement of claim 14 wherein said flapper valve is located outside of said ring and said ends are connected to a radially outer edge of said ring; and wherein said tabs are located at a radially inner edge of said ring.

* * * * *